(12) United States Patent
Gou et al.

(10) Patent No.: US 12,259,510 B2
(45) Date of Patent: *Mar. 25, 2025

(54) DEVICES FOR FULL-WAVE FIELD SEISMIC SOURCE BASED ON GAS EXPLOSION TECHNOLOGIES AND METHODS FOR ACQUIRING SEISMIC DATA

(71) Applicants: BGP INC., CHINA NATIONAL PETROLEUM CORPORATION, Hebei (CN); OPTICAL SCIENCE AND TECHNOLOGY (CHENGDU) LTD., Sichuan (CN)

(72) Inventors: Liang Gou, Baoding (CN); Gang Yu, Baoding (CN); Maojun Yang, Baoding (CN); Ximing Wang, Chengdu (CN)

(73) Assignees: BGP INC., CHINA NATIONAL PETROLEUM CORPORATION, Baoding (CN); OPTICAL SCIENCE AND TECHNOLOGY (CHENGDU) LTD., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/637,442

(22) Filed: Apr. 16, 2024

(65) Prior Publication Data
US 2024/0264319 A1 Aug. 8, 2024

Related U.S. Application Data
(63) Continuation of application No. 18/503,153, filed on Nov. 6, 2023, now Pat. No. 11,994,637, which is a
(Continued)

(30) Foreign Application Priority Data
Dec. 8, 2021 (CN) .......................... 202111492086.0

(51) Int. Cl.
*G01V 1/137* (2006.01)
*G01V 1/04* (2006.01)

(52) U.S. Cl.
CPC ................ *G01V 1/137* (2013.01); *G01V 1/04* (2013.01)

(58) Field of Classification Search
CPC .......... G01V 1/04; G01V 1/104; G01V 1/112; G01V 1/137
(Continued)

(56) References Cited

U.S. PATENT DOCUMENTS

| 4,114,723 A | 9/1978 | Paitson et al. |
| 4,633,946 A | 1/1987 | Jackson |

(Continued)

FOREIGN PATENT DOCUMENTS

| CN | 1083224 A | 3/1994 |
| CN | 109270571 A | 1/2019 |

(Continued)

OTHER PUBLICATIONS

English translation of CN 110632646 A, accessed Oct. 31, 2024 via Espacenent.com, <https://translationportal.epo.org/emtp/translate/?ACTION=description-retrieval&COUNTRY=CN&ENGINE=google&FORMAT=docdb&KIND=A&LOCALE=en_EP&NUMBER=110632646&SRCLANG=zh&TRGLANG=en> (Year: 2019).*

(Continued)

*Primary Examiner* — Jeremy A Luks
(74) *Attorney, Agent, or Firm* — Porus IP LLC

(57) ABSTRACT

The present disclosure provides a device for full-wave field seismic source based on a gas explosion technology and a method for acquiring seismic data. The device includes a cylindrical explosion-proof metal outer barrel, and four sides of the explosion-proof metal outer barrel are fixedly connected to four high-strength steel plates. The device also
(Continued)

includes a cylindrical explosion-proof metal gas explosion inner barrel and pipelines for injecting high-pressure air and high-pressure gas into the gas explosion inner barrel. A center of the gas explosion inner barrel is installed with an electronic ignition gun, which is connected to a GPS timing module connected to the electronic ignition gun. The device further includes a controller configured to control a seismic source of a gas explosion full-wave field. Longitudinal wave source signals propagating vertically downward and perpendicular to ground, shear wave source signals propagating downward and parallel to a seismic source line direction, and shear wave source signals propagating downward and perpendicular to the seismic source line direction are triggered in sequence at each seismic source point. Longitudinal wave data and two transverse wave data orthogonal to each other and parallel to the ground excited through the each seismic source point are recorded in sequence by three-component geophones deployed on the ground, thereby achieving full-wave field exploration.

8 Claims, 4 Drawing Sheets

Related U.S. Application Data continuation of application No. PCT/CN2022/082396, filed on Mar. 23, 2022.

(58) Field of Classification Search
USPC .......................................................... 181/117
See application file for complete search history.

(56) References Cited

U.S. PATENT DOCUMENTS

| | | | |
|---|---|---|---|
| 6,648,097 | B2 | 11/2003 | Tite et al. |
| 9,804,280 | B2 | 10/2017 | Chelminski |
| 11,994,637 | B2 * | 5/2024 | Gou .................. G01V 1/137 |
| 2007/0115756 | A1 | 5/2007 | Guion |
| 2024/0085581 | A1 | 3/2024 | Gou et al. |

FOREIGN PATENT DOCUMENTS

| | | |
|---|---|---|
| CN | 110609315 A | 12/2019 |
| CN | 110632646 A | 12/2019 |
| CN | 110646836 A | 1/2020 |
| CN | 210775862 U | 6/2020 |
| CN | 210775863 U | 6/2020 |
| CN | 109633738 B | 11/2020 |
| CN | 113568037 A | 10/2021 |
| FR | 2637695 A1 | 4/1990 |

OTHER PUBLICATIONS

International Search Report in PCT/CN2022/082396 mailed on Jun. 14, 2022, 6 pages.
Written Opinion in PCT/CN2022/082396 mailed on Jun. 14, 2022, 9 pages.

* cited by examiner

DEVICES FOR FULL-WAVE FIELD SEISMIC SOURCE BASED ON GAS EXPLOSION TECHNOLOGIES AND METHODS FOR ACQUIRING SEISMIC DATA

CROSS-REFERENCE

This application is a continuation of U.S. patent application Ser. No. 18/503,153, filed on Nov. 6, 2023, which is a Continuation of International Application No. PCT/CN2022/082396, filed on Mar. 23, 2022, which claims priority to Chinese Patent Application No. 202111492086.0, filed on Dec. 8, 2021, the entire contents of each of which are hereby incorporated by reference.

TECHNICAL FIELD

The present disclosure relates to the field of vibration-exciting methods for exploring a seismic source of an earthquake in the area of geophysical exploration techniques, and in particular, to a device for full-wave field seismic source based on a gas explosion technology and a method for acquiring seismic data.

BACKGROUND

Seismic waves in seismic exploration are artificially generated. Artificial seismic sources are generally divided into two major types: explosive sources and non-explosive sources. Explosive sources primarily involve solid explosives, detonation by detonators, and physical explosions (such as air guns, spark ignitions, heavy hammers, etc.), each of which is within a limited stimulation range and usage condition.

Air-gun seismic sources fall under a category of the non-explosive sources. Air-gun seismic sources involve igniting a mixture of gases (such as propane and oxygen) within a sealed cylindrical chamber, and driving an active bottom plate of the chamber to impact the ground to generate seismic waves. The type of seismic sources mentioned above are similar to a hammer source, which is typically ignited simultaneously by three or more pneumatic devices, with ignition signals transmitted to recording devices in a wireless manner. The air-gun seismic sources are mounted on heavy vehicles and produce pulses rich in low frequencies, thereby making the pulses have a greater penetration ability, which are suitable for land-based exploration. An equivalent of the air-gun sources used in marine environments is referred to as a water gun.

The air-gun seismic sources are also referred to as "air gun sources." The air-gun seismic sources introduce a mixture of propane, oxygen, or air into the explosion chamber and ignite the mixture with an electric spark to generate seismic waves directly or to propel a heavy object to impact the ground. The air-gun seismic sources may be used in marine and land applications. Other gases such as ammonia and some nitrogen carbon compounds may also be used as explosives in the air-gun seismic sources after the gases mentioned above are mixed. However, the explosives require specialized ignition equipment. The air-gun seismic sources are superior in terms of transportation compared to solid explosives, which have higher seismic energy among non-explosive sources. However, the air-gun seismic sources require carrying various containers filled with gases, and to some extent, pose safety risks.

Currently, in the seismic exploration industry, various source devices or equipment used on land may only excite either P-wave source signals or S-wave source signals individually. An artificial source for simultaneously or sequentially exciting a full-wave field at a same location has not been observed. To excite a full-wave field source signal at the same location, it is currently necessary to replace the source device or equipment during operations to separately excite P-wave source signals and S-wave source signals, thereby causing low production efficiency. After the source device or equipment is changed, it is difficult to ensure that different source devices or equipment have completely consistent coupling conditions with the ground, thus, making subsequent data processing work challenge to be carried out smoothly.

SUMMARY

The present disclosure focuses on overcoming shortcomings of prior arts and providing a device for full-wave field seismic source based on a gas explosion technology and a method for acquiring seismic data using the device for full-wave field seismic source based on the gas explosion technology.

To achieve the above objectives, the technical solutions illustrated in the present disclosure are as follows:

Some embodiments of the present disclosure provides a device for full-wave field seismic source based on a gas explosion technology. The device includes a cylindrical explosion-proof metal outer barrel with high pressure resistance and high strength and a cylindrical explosion-proof metal gas explosion inner barrel with high pressure resistance and high strength. The explosion-proof metal outer barrel and the explosion-proof metal gas explosion inner barrel are provided as a coaxial line arrangement, and the explosion-proof metal gas explosion inner barrel is configured to rotate relative to the explosion-proof metal outer barrel.

An outer wall of the explosion-proof metal outer barrel is symmetrically provided with four outer barrel vertical grooves, and a bottom center of the explosion-proof metal outer barrel is provided with an outer barrel round hole. The outer barrel vertical grooves are provided with outer barrel long strip lids, and the outer barrel round hole is provided with an outer barrel circular lid.

The outer wall of the explosion-proof metal outer barrel is further connected with four high-strength steel plates. The four high-strength steel plates are provided in a symmetric arrangement, wherein a length of each of the four high-strength steel plates is within a range of 1 meter to 5 meters, and a width of the each of the four high-strength steel plates is equal to a height of the explosion-proof metal outer barrel.

The explosion-proof metal gas explosion inner barrel is divided into two gas explosion chambers according to an eight-trigrams-double-fish pattern, wherein the two gas explosion chambers are connected to pipelines configured to inject high-pressure air and high-pressure gas, portions of fish tail tips of the two gas explosion chambers are provided with inner barrel vertical grooves, bottom centers of the two gas explosion chambers are provided with round holes, the inner barrel round holes are provided with inner barrel circular lids, and the inner barrel vertical grooves are provided with inner barrel long strip lids.

The device for full-wave field seismic source further includes a first explosion-proof metal gas tank with high pressure resistance and high strength and a second explosion-proof metal gas tank with high pressure resistance and high strength, wherein the first explosion-proof metal gas tank is configured to store compressed air and the second explosion-proof metal gas tank is configured to store compressed gas.

An electronic ignition gun is installed on a center of the explosion-proof metal gas explosion inner barrel, and the electronic ignition gun is connected to a GPS timing module.

The device for full-wave field seismic source further includes a controller configured to control the electronic ignition gun and an opening and closing of the outer barrel long strip lids, the outer barrel circular lid, inner barrel circular lids, and inner barrel long strip lids.

Some embodiments of present disclosure provides a method for acquiring seismic data using the device for full-wave field seismic source based on the gas explosion technology. The method includes the following steps:

S1, arranging three-component geophones in a full-wave field seismic exploration work area in accordance with geophone positions laid out on a construction design scheme, so that for each of the three-component geophones, directions of two horizontal components of the three-component geophone are parallel and perpendicular to a survey line of the three-component geophone;

S2, excavating a pit body based on artificial seismic source locations laid out on the construction design plan, burying the device for full-wave field seismic source into the pit body, so that a pair of the high-strength steel plates on two sides of the explosion-proof metal outer barrel are oriented in a same direction of a seismic source line, releasing a connection between a pair of the high-strength steel plates parallel to the direction of the seismic source line and the explosion-proof metal outer barrel, so that the pair of the high-strength steel plates parallel to the direction of the seismic source line do not rotate with the explosion-proof metal outer barrel, and backfilling the pit body and compacting backfilled soil or sediment;

S3, rotating a connecting line of two inner barrel vertical grooves of the explosion-proof metal gas explosion inner barrel to a direction parallel to the seismic source line, locking the explosion-proof metal gas explosion inner barrel, so that the explosion-proof metal gas explosion inner barrel is unable to be rotated in any direction, and locking two high-strength steel plates perpendicular to the seismic source line, so that the two high-strength steel plates perpendicular to the seismic source line are rotated with the explosion-proof metal outer barrel;

S4, locking two inner barrel long strip lids on two side surfaces of the explosion-proof metal gas explosion inner barrel through the controller, locking the four outer barrel long strip lids on a side surface of the explosion-proof metal outer barrel, and opening two inner barrel circular lids of the explosion-proof metal gas explosion inner barrel and the outer barrel circular lid of the explosion-proof metal outer barrel through the controller;

S5, opening simultaneously gas supply valves of the first explosion-proof metal gas tank and the second explosion-proof metal gas tank to inject exactly a same volume of the high-pressure air and the high-pressure gas into the two gas explosion chambers inside the explosion-proof metal gas explosion inner barrel through the controller;

S6, detonating simultaneously high-pressure mixed gas inside the explosion-proof metal gas explosion inner barrel in accordance with a pre-designed time through the electronic ignition gun by using the GPS timing module of the controller;

S7, pushing away the inner barrel circular lids and the outer barrel circular lid with a high speed when a pressure of high-pressure explosion gas generated by an explosion of the high-pressure mixed gas inside the explosion-proof metal gas explosion inner barrel reaches a certain threshold value, so that the inner barrel circular lids and the outer barrel circular lid impact stratum at a bottom of the explosion-proof metal outer barrel to generate longitudinal waves propagating downwardly;

S8, locking the inner barrel circular lids and the outer barrel circular lid, and opening the inner barrel long strip lids and the outer barrel long strip lids through the controller;

S9, opening simultaneously the gas supply valves of the first explosion-proof metal gas tank and the second explosion-proof metal gas tank to inject exactly the same volume of the high-pressure air and the high-pressure gas into the two gas explosion chambers inside the explosion-proof metal gas explosion inner barrel;

S10, detonating simultaneously the high-pressure mixed gas inside the explosion-proof metal gas explosion inner barrel in accordance with the pre-designed time through the electronic ignition gun by using the GPS timing module of the controller;

S11, pushing away the inner barrel long strip lids and the outer barrel long strip lids with a high speed when the pressure of the high-pressure explosion gas generated by the explosion of the high-pressure mixed gas inside the explosion-proof metal gas explosion inner barrel reaches the certain threshold value, so that the high-pressure explosion gas impacts two corresponding wall surfaces of the explosion-proof metal outer barrel with a high speed along two opposite tangent directions of the explosion-proof metal gas explosion inner barrel, thereby causing the explosion-proof metal outer barrel to rotate around a central axis, and the high-strength steel plates fixed on the explosion-proof metal outer barrel are driven to be rotated with the explosion-proof metal outer barrel;

S12, generating shear transverse waves parallel to the survey line of the seismic source that are centered on the explosion-proof metal outer barrel through an underground medium based on the rotation of the high-strength steel plates;

S13, opening the explosion-proof metal gas explosion inner barrel fixedly locked in step S2, rotating the explosion-proof metal gas explosion inner barrel with 90 degrees in a clockwise or counterclockwise direction, rotating the connecting line of the two inner barrel vertical grooves of the explosion-proof metal gas explosion inner barrel in a direction perpendicular to the seismic source line, fixing and locking the explosion-proof metal gas explosion inner barrel, so that the explosion-proof metal gas explosion inner barrel is unable to be further rotated in any direction, locking the two high strength steel plates parallel to the direction of the seismic source line, so that the two high strength steel plates parallel to the direction of the seismic source line are able to rotate with the explosion-proof metal outer barrel, and releasing the connection between the pair of the high strength steel plates perpendicular to the direction of the seismic source line and the explosion-proof metal outer barrel, so that the pair of the high strength steel plates perpendicular to the direction of the seismic source line are unable to be rotated with the explosion-proof metal outer barrel;

S14, opening the inner barrel long strip lids and the outer barrel long strip lids through the controller;

S15, opening simultaneously the gas supply valves of the first explosion-proof metal gas tank and the second explosion-proof metal gas tank to inject exactly the same volume of the high-pressure air and the high-pressure gas into the two gas explosion chambers inside the explosion-proof metal gas explosion inner barrel;

S16, detonating simultaneously the high-pressure mixed gas inside the explosion-proof metal gas explosion inner barrel in accordance with the pre-designed time through the electronic ignition gun by using the GPS timing module of the controller;

S17, pushing away two of the inner barrel long strip lids and the outer barrel long strip lids with a high speed when the pressure of the high-pressure explosion gas generated by the explosion of the high-pressure mixed gas inside the explosion-proof metal gas explosion inner barrel reaches the certain threshold value, so that the high-pressure explosion gas impacts the two corresponding wall surfaces of the explosion-proof metal outer barrel with a high speed along the two opposite tangent directions of the explosion-proof metal gas explosion inner barrel, thereby causing the explosion-proof metal outer barrel to rotate around the central axis, and the high-strength steel plates fixed on the explosion-proof metal outer barrel are driven to be rotated with the explosion-proof metal outer barrel;

S18, generating the shear transverse waves perpendicular to a direction of the survey line of the seismic source that are centered on the explosion-proof metal outer barrel through the underground medium based on the rotation of the high-strength steel plates;

S19, acquiring longitudinal wave data and two transverse wave data orthogonal to each other and parallel to ground excited in sequence through a seismic source point on the ground in three times in accordance with the three-component geophones deployed on the construction design scheme;

S20, acquiring the longitudinal wave data and the two transverse wave data orthogonal to each other and parallel to the ground excited in sequence through the seismic source point on the ground in three times in accordance with a location of each seismic source point within the full-wave field seismic exploration work area in accordance with steps S2 to S19;

S21, combining and merging the longitudinal wave data, the transverse wave data parallel to the survey line of the seismic source, and the transverse wave data perpendicular to the survey line of the seismic source acquired in sequence from all seismic source points, respectively, to form full-wave field-three-dimensional seismic data volumes of three components in three directions respectively; S22, processing three-dimensional seismic longitudinal waveform data volume of a vertical component, transverse waveform data volume of a horizontal component parallel to the direction of the survey line of the seismic source, and horizontal component transverse waveform data volume of a horizontal component perpendicular to the direction of the survey line of the seismic source, respectively, obtaining reflection longitudinal waveform imaging data volume of the vertical component, reflection transverse waveform imaging data volume of the horizontal component parallel to the direction of the survey line of the seismic source, and reflection transverse waveform imaging data volume of the horizontal component perpendicular to the direction of the survey line of the seismic source in sequence, and carrying out interpretation of a fine structure of an underground geologic body by integrating three sets of reflection wave imaging data volumes; and S23, extracting relevant attributes by performing an inversion processing on the three sets of reflection wave imaging data volumes, respectively, and carrying out comprehensive prediction, evaluation, and quantitative interpretation of fluid distribution within the underground geologic body and oil and gas reservoir.

BRIEF DESCRIPTION OF THE DRAWINGS

The present disclosure will be further illustrated by way of exemplary embodiments, which will be described in detail through the accompanying drawings. These embodiments are not limiting, and in these embodiments the same numbering indicates the same structure, wherein.

DETAILED DESCRIPTION

The following, in conjunction with the accompanying drawings, provides a detailed description of the embodiments of the present disclosure. However, these embodiments do not constitute limitations on the present disclosure. The embodiments are presented for illustrative purposes only. Additionally, advantages of the present disclosure become clearer and easier to be comprehended through the following illustrations.

Figure 1:
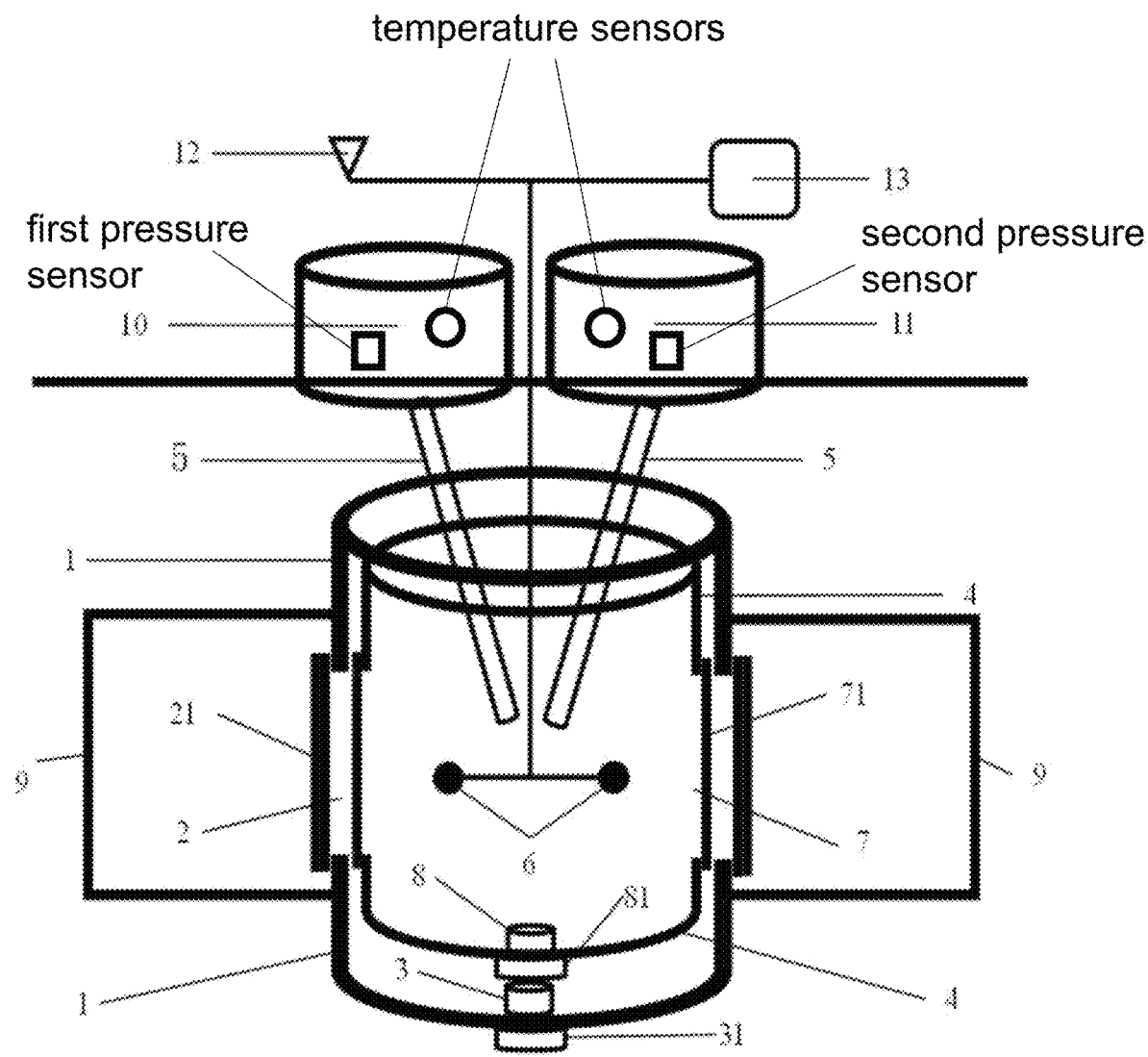
FIG. 1 is a schematic diagram of a basic structure according to some embodiments of the present disclosure.
Figure 2:
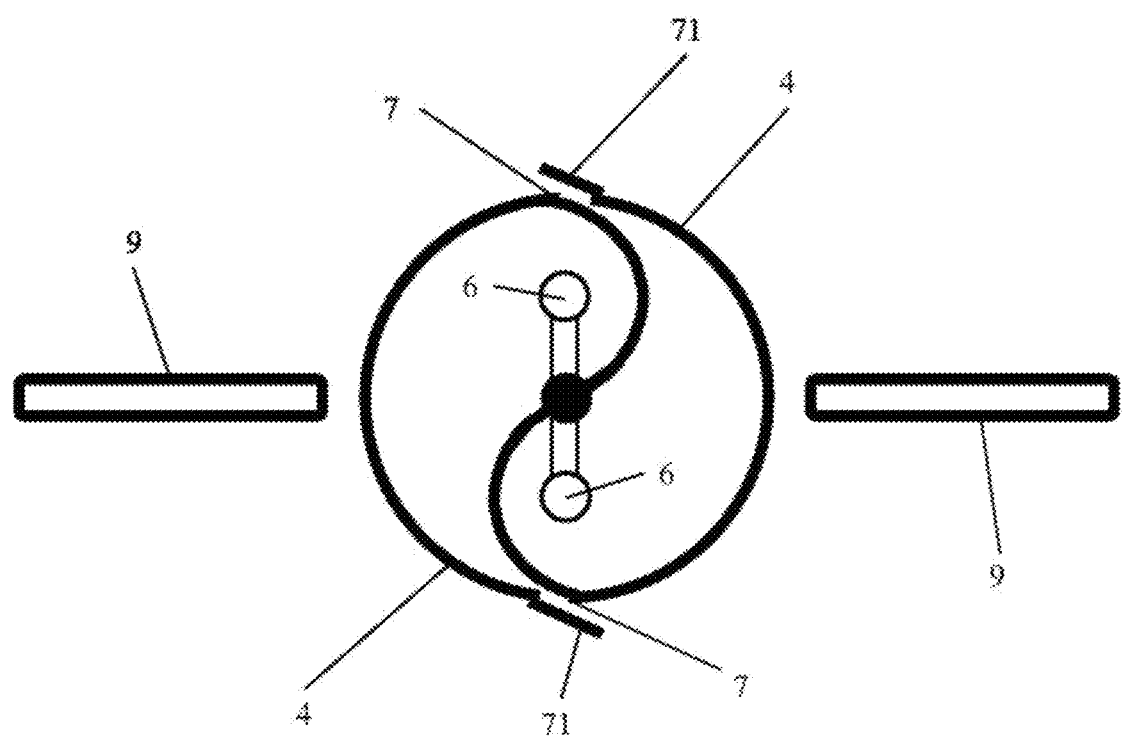
FIG. 2 is a schematic diagram of generating shear transverse waves perpendicular to a direction of a survey line of a seismic source through an excitation according to some embodiments of the present disclosure.
Figure 3:
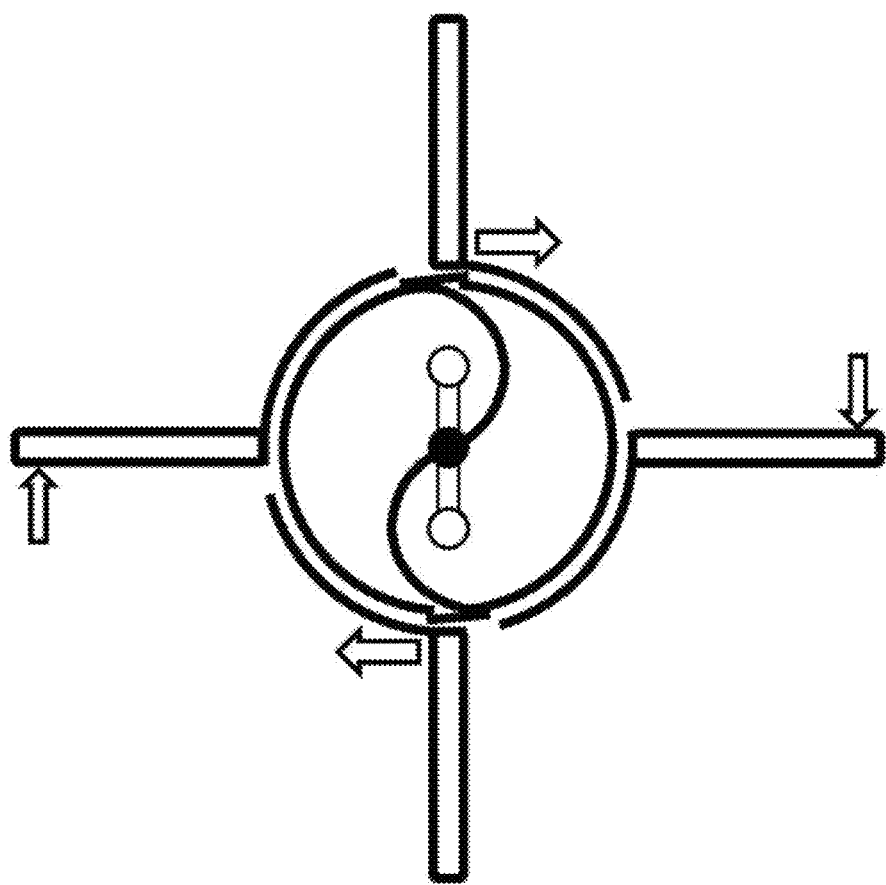
FIG. 3 is a schematic diagram of generating shear transverse waves parallel to a direction of a survey line of a seismic source through an excitation according to some embodiments of the present disclosure.
Figure 4:
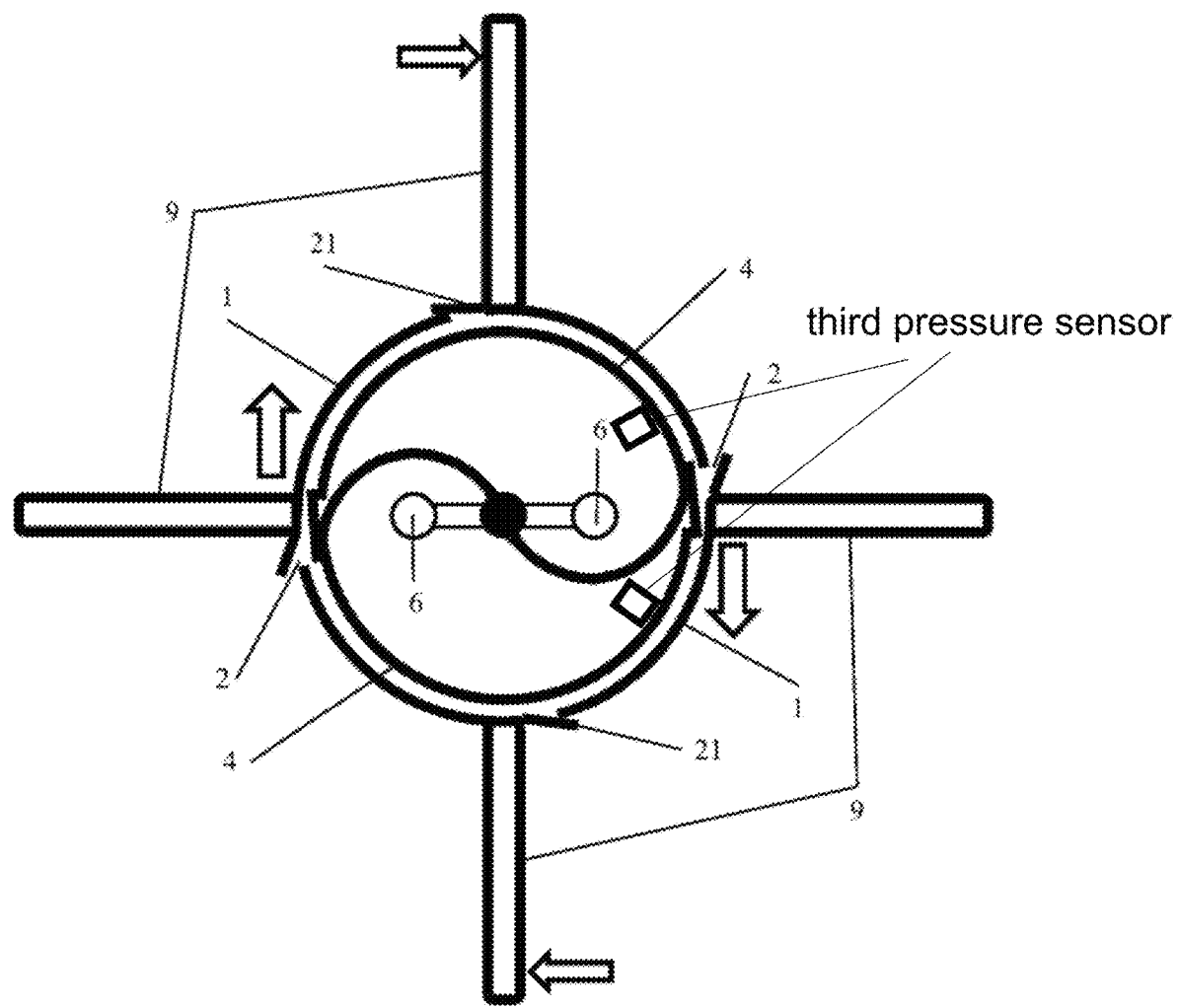
FIG. 4 is a schematic plan view of a structure of an explosion-proof metal gas explosion inner barrel according to some embodiments of the present disclosure.

FIG. 1 is a schematic diagram of a basic structure according to some embodiments of the present disclosure; FIG. 2 is a schematic diagram of generating shear transverse waves perpendicular to a direction of a survey line of a seismic source through an excitation according to some embodiments of the present disclosure; FIG. 3 is a schematic diagram of generating shear transverse waves parallel to a direction of a survey line of a seismic source through an excitation according to some embodiments of the present disclosure; and FIG. 4 is a schematic plan view of a structure of an explosion-proof metal gas explosion inner barrel according to some embodiments of the present disclosure.

As shown in FIG. 1, a device for full-wave field seismic source based on a gas explosion technology includes a cylindrical explosion-proof metal outer barrel 1 with high pressure resistance and high strength and a cylindrical explosion-proof metal gas explosion inner barrel 4 with high pressure resistance and high strength. The explosion-proof metal outer barrel 1 and the explosion-proof metal gas explosion inner barrel 4 are provided as a coaxial line arrangement, and the explosion-proof metal gas explosion inner barrel 4 is configured to rotate relative to the explosion-proof metal outer barrel 1.

An outer wall of the explosion-proof metal outer barrel 1 is symmetrically provided with four outer barrel vertical grooves 2, and a bottom center of the explosion-proof metal outer barrel is provided with an outer barrel round hole 3. The outer barrel vertical grooves 2 are provided with outer barrel long strip lids 21, and the outer barrel round hole 3 is provided with an outer barrel circular lid 31.

The outer wall of the explosion-proof metal outer barrel 1 is further connected with four high-strength steel plates 9. The four high-strength steel plates 9 are provided in a symmetric arrangement. A length of each of the four high-strength steel plates 9 is within a range of 1 meter to 5 meters, and a width of the each of the four high-strength steel plates 9 is equal to a height of the explosion-proof metal outer barrel 1.

As shown in FIG. 4, the explosion-proof metal gas explosion inner barrel 4 is divided into two gas explosion chambers according to an eight-trigrams-double-fish pattern. The two gas explosion chambers are connected to pipelines 5 configured to inject high-pressure air and high-pressure gas. Portions of fish tail tips of the two gas explosion chambers are provided with inner barrel vertical grooves 7, and bottom centers of the two gas explosion chambers are provided with inner barrel round holes 8. The inner barrel round holes 8 are provided with inner barrel circular lids 81, and the inner barrel vertical grooves 7 are provided with inner barrel long strip lids 71.

The device for full-wave field seismic source further includes a first explosion-proof metal gas tank 10 with high pressure resistance and high strength and a second explosion-proof metal gas tank 11 with high pressure resistance and high strength. The first explosion-proof metal gas tank 10 is used to store compressed air and the second explosion-proof metal gas tank 11 is used to sore compressed gas. A high-pressure range may be greater than or equal to 10 MPa and less than 100 MPa, and a high-strength range may be a tensile strength greater than 1200 MPa and less than or equal to 1500 MPa.

An electronic ignition gun 6 is installed on a center of the explosion-proof metal gas explosion inner barrel 4, and the electronic ignition gun 6 is connected to a GPS timing module 12.

The device for full-wave field seismic source further includes a controller 13. The controller 13 is configured to control the electronic ignition gun 6 to detonate high-pressure mixed gas in the explosion-proof metal gas explosion inner barrel 4, and the controller 13 also is configured to control an opening and closing of various lids. The various lids may include the inner barrel long strip lids 71, the outer barrel long strip lids 21, the inner barrel circular lids 81, the outer barrel circular lid 31, etc.

The explosion-proof metal gas explosion inner barrel 4 inside the explosion-proof metal outer barrel 1 may be rotated clockwise or counterclockwise, thereby facilitating the generation of mutually orthogonal radial shear waves during two consecutive excitations before and after a 90-degree rotation. More details may be found elsewhere in the present disclosure, such as FIGS. 2 and 3 and the related descriptions thereof.

The compressed gas stored in the second explosion-proof metal gas tank 11 may be propane, oxygen, methane, ethylene, acetylene, gasoline vapor, or other fuel gases.

The outer barrel circular lid 31 and inner barrel circular lids 81 are closed when the mixed gas has not exploded. When the mixed gas is exploded, tremendous explosion pressure pushes down the outer barrel circular lid 31 and the inner barrel circular lids 81, thereby causing the outer barrel circular lid 31 and the inner barrel circular lids 81 to impact the ground at a bottom of the explosion-proof metal outer barrel 1 with a high speed to trigger downward seismic longitudinal waves.

Openable and closable outer barrel long strip lids 21 are provided outside the outer barrel vertical grooves 2, and openable and closable inner barrel long strip lids 71 are provided outside the inner barrel vertical grooves 7. The outer barrel long strip lids 21 and the inner barrel long strip lids 71 are closed when the mixed gas is not exploded. When the mixed gas is exploded, the tremendous explosion pressure pushes the outer barrel long strip lids 21 and the inner barrel long strip lids 71 to two sides, so that the high-pressure explosion gas impacts two corresponding wall surfaces of the explosion-proof metal outer barrel 1 with a high speed along two opposite tangent directions of the explosion-proof metal gas explosion inner barrel 4, thereby causing the explosion-proof metal outer barrel 1 to rotate around a central axis. At this time, the high-strength steel plates 9 fixedly connected to the outside of the explosion-proof metal outer barrel 1 are driven to be rotated with the explosion-proof metal outer barrel 1. Two high-strength steel plates 9 arranged in a same direction are driven to be rotated together with the rotation of the explosion-proof metal outer barrel 1. The two high-strength steel plates 9 driven to be rotated with the rotation of the explosion-proof metal outer barrel 1 may 1 may be used to generate shear waves in underground medium that are centered on the explosion-proof metal outer barrel 1 and perpendicular to a direction of a connecting line of two vertical grooves.

In some embodiments, the device for full-wave field seismic source further includes a pressure sensing unit.

The pressure sensing unit is configured to monitor pressure data. The pressure data refers to data related to a pressure borne by a certain component on the device for full-wave field seismic source. The certain component may include one or more of the first explosion-proof metal gas tank 10, the second explosion-proof metal gas tank 11, the explosion chambers, etc.

In some embodiments, the pressure data may include first pressure data and second pressure data.

The first pressure data refers to data related to a pressure inside the first explosion-proof metal gas tank 10.

In some embodiments, the first pressure data may include a plurality of gas pressure values borne by an inner wall of the first explosion-proof metal gas tank 10 at a plurality of consecutive preset time points.

The plurality of consecutive preset time points may be consecutive preset time points within a preset time period (e.g., 10 seconds or 30 seconds, etc.). The plurality of consecutive preset time points may be determined by those skilled in the art based on experience.

The second pressure data refers to data related to a pressure inside the second explosion-proof metal gas tank 11.

In some embodiments, the second pressure data may include a plurality of gas pressure values borne by an inner wall of the second explosion-proof metal gas tank 11 at a plurality of consecutive preset time points.

In some embodiments, the pressure sensing unit at least includes a first pressure sensor deployed inside the first explosion-proof metal gas tank 10 and a second pressure sensor deployed inside the second explosion-proof metal gas tank 11.

The first pressure sensor is configured to monitor the first pressure data inside the first explosion-proof metal gas tank 10.

The second pressure sensor is configured to monitor the second pressure data inside the second explosion-proof metal gas tank 11.

In some embodiments, the pressure data may reflect volumes of air and gas injected into the two explosion chambers. For example, when the first pressure data indicates that the gas pressure inside the first explosion-proof metal gas tank 10 is decreased to a preset pressure value, it is determined that the volume of air injected into the two explosion chambers reaches a preset volume. The preset pressure value and preset volume may be preset by those skilled in the art based on experience.

In some embodiments of the present disclosure, by monitoring the gas pressure values inside the first explosion-proof metal barrel 10 and the second explosion-proof metal barrel 11, the monitoring that whether the volumes of air and gas injected into the two explosion chambers reach the preset volume may be achieved. After a same volume of high-pressure air and high-pressure gas are injected into the two explosion chambers, the electronic ignition gun is then activated to ignite gas explosion, thereby ensuring the accuracy of comprehensive prediction, evaluation, and quantitative interpretation of fluid distribution within an underground geologic body and oil and gas reservoir.

In some embodiments, the device for full-wave field seismic source may further include gas flow rate monitoring devices and temperature sensors. In some embodiments, the gas flow rate monitoring devices are deployed inside the pipelines 5, and the temperature sensors are deployed inside the first explosion-proof metal gas tank 10 and the second explosion-proof metal gas tank 11.

In some embodiments, the gas flow rate monitoring devices are configured to monitor flow rate data inside the pipelines 5. The flow rate data refers to data related to flow rates when air and gas are injected into the pipelines 5.

In some embodiments, the flow rate data may include first flow rate data and second flow rate data.

The first flow rate data may include a plurality of flow velocities corresponding to the injection of air into the pipeline 5 by the first explosion-proof metal gas tank 10 at a plurality of consecutive preset time points.

The second flow rate data may include a plurality of flow velocities corresponding to the injection of gas into the pipeline 5 by the second explosion-proof metal gas tank 11 at the plurality of consecutive preset time points.

In some embodiments, the temperature sensors are configured to monitor temperature data inside the first explosion-proof metal gas tank 10 and the second explosion-proof metal gas tank 11.

In some embodiments, the temperature data may include first temperature data and second temperature data. The first temperature data may include a plurality of temperature values inside the first explosion-proof metal gas tank 10 at a plurality of consecutive preset time points. The second temperature data may include a plurality of temperature values inside the second explosion-proof metal gas tank 11 at a plurality of consecutive preset time points.

In some embodiments, the controller 13 may also be configured to determine a stopping time of the first explosion-proof metal gas tank 10 based on the first pressure data, the first flow rate data, and the first temperature data. Furthermore, the controller 13 may be configured to determine a stopping time of the second explosion-proof metal gas tank 11 based on the second pressure data, the second flow rate data, and the second temperature data.

The stopping times refers to a time point when the first explosion-proof metal gas tank 10 stops injecting air into the explosion chamber and a time point when the second explosion-proof metal gas tank 11 stops injecting gas into the explosion chamber.

In some embodiments, the controller 13 may determine a first target feature vector based on the first pressure data, the first flow rate data, and the first temperature data, determine a first correlated feature vector based on the first target feature vector by using a vector database, and determine a reference stopping time for the first explosion-proof metal gas tank 10 corresponding to the first correlated feature vector as the stopping time for the first explosion-proof metal gas tank 10.

The vector database includes a plurality of first reference feature vectors, and each of the plurality of first reference feature vectors corresponds to a reference stopping time for the first explosion-proof metal gas tank 10. The first reference feature vectors are constructed based on historical first pressure data, historical first flow rate data, and historical first temperature data.

In some embodiments, the controller 13 may determine the first reference feature vector satisfying a preset condition based on the first target feature vector in the vector database, and determine the first reference feature vector satisfying the preset condition as the first correlated feature vector. In some embodiments, the preset condition may include a minimum vector distance with the first target feature vector, etc.

In some embodiments, the controller 13 may determine the stopping time for the first explosion-proof metal gas tank 10 based on the reference stopping time for the first explosion-proof metal gas tank 10 corresponding to the determined first correlated feature vector.

In some embodiments, the controller 13 may determine a second target feature vector based on the second pressure data, the second flow rate data, and the second temperature data, determine a second correlated feature vector based on the second target feature vector by using the vector database, and determine a reference stopping time for the second explosion-proof metal gas tank 11 corresponding to the second correlated feature vector as the stopping time for the second explosion-proof metal gas tank 11.

The vector database includes a plurality of second reference feature vectors, and each of the plurality of second reference feature vectors corresponds to a reference stopping time for the second explosion-proof metal gas tank 11. The second reference feature vectors are constructed based on historical second pressure data, historical second flow rate data, and historical second temperature data.

In some embodiments, a manner for determining the second reference feature vector is similar to the manner for determining the first reference feature vector. More details may be found in the illustrations mentioned above.

In some embodiments of the present disclosure, by regulating the process of injecting air and gas into the pipelines 5, the volumes of air and gas injected into the two explosion chambers are ensured to be the same, which aligns with the operating requirements of the device for full-wave field seismic source.

In some embodiments, the pressure sensing unit may also include third pressure sensors. In some embodiments, third pressure sensors are deployed inside the two explosion chambers. For example, the third pressure sensors may be deployed within the explosion chambers in an annular shape. The third pressure sensors may be configured to monitor third pressure data inside the two explosion chambers.

The third pressure data refers to data related to pressures inside the explosion chambers.

In some embodiments, the third pressure data may include a plurality of gas pressure values borne by inner walls of the explosion chambers at a plurality of consecutive preset time points.

In some embodiments of the present disclosure, the deployment of the third pressure sensor enables the monitoring of the third pressure data inside the two explosion chambers, thereby allowing for timely detection of any gas leakage within the explosion chambers.

In some embodiments, the controller 13 is further configured to determine predicted current third pressure data based on the first pressure data obtained by the first pressure sensor, the second pressure data obtained by the second pressure sensor, the third pressure data obtained by the third pressure sensor, and the temperature data obtained by the temperature sensors by using a preset algorithm. Furthermore, the controller 13 is configured to determine an explosion chamber that satisfies a preset condition based on the predicted current third pressure data and current third pressure data obtained by the third pressure sensors to issue a warning notification.

In some embodiments, the first pressure data may include current first pressure data and historical first pressure data.

The current first pressure data may include a plurality of gas pressure values borne by the inner wall of the first explosion-proof metal gas tank 10 at a plurality of consecutive preset time points within a current preset time period. The current preset time period may be, for example, the current 10 seconds, 30 seconds, etc. The current preset time period may be preset by those skilled in the art based on experience.

The historical first pressure data may include a plurality of gas pressure values borne by the inner wall of the first explosion-proof metal gas tank 10 at a plurality of consecutive preset historical time points within a historical preset time period. The historical preset time period may be, for example, 10 seconds, 30 seconds, etc., before a current time point. The historical preset time period may be preset by those skilled in the art based on experience.

In some embodiments, the second pressure data may include current second pressure data and historical second pressure data. The current second pressure data may include a plurality of gas pressure values borne by the inner wall of the second explosion-proof metal gas tank 11 at a plurality of consecutive preset time points within a current preset time period. The historical second pressure data may include a plurality of gas pressure values borne by the inner wall of the second explosion-proof metal gas tank 11 at a plurality of consecutive preset historical time points within a historical preset time period.

In some embodiments, the third pressure data may include current third pressure data and historical third pressure data. The current third pressure data may include a plurality of gas pressure values borne by the inner walls of the explosion chambers at a plurality of consecutive preset time points within a current preset time period. The historical third pressure data includes a plurality of gas pressure values borne by the inner walls of the explosion chambers at a plurality of consecutive preset historical time points within a historical preset time period.

In some embodiments, the temperature data may include current temperature data and historical temperature data. The historical temperature data may include historical first temperature data and/or historical second temperature data. The historical first temperature data includes a plurality of temperature values inside the first explosion-proof metal gas tank 10 at a plurality of consecutive preset historical time points within a historical preset time period. The historical second temperature data includes a plurality of temperature values inside the second explosion-proof metal gas tank 11 at a plurality of consecutive preset historical time points within a historical preset time period. The current temperature data may include current first temperature data and/or current second temperature data. The current first temperature data may include a plurality of temperature values inside the first explosion-proof metal gas tank 10 at a plurality of consecutive preset time points within a current preset time period. The current second temperature data may include a plurality of temperature values inside the second explosion-proof metal gas tank 11 at a plurality of consecutive preset time points within a current preset time period.

The preset algorithm refers to an algorithm pre-established for predicting the current third pressure data.

In some embodiments, the controller 13 may establish a functional relationship between the first pressure data, the second pressure data, the temperature data, and the third pressure data based on the historical first pressure data, the historical second pressure data, the historical third pressure data, and the historical temperature data by using an algorithm (e.g., a fitting algorithm, etc.).

For example, the controller 13 may establish the functional relationship between the first pressure data, the second pressure data, the temperature data, and the third pressure data based on the historical first pressure data, the historical second pressure data, the historical third pressure data, and the historical temperature data by using the fitting algorithm.

Merely by way of example, the functional relationship obtained based on the fitting algorithm may be expressed as: $y=a*x1+b*x2+c*t$, wherein y refers to the third pressure data, x1 refers to the first pressure data, x2 refers to the second pressure data, t refers to the temperature data, and a, b, and c are specific coefficient values obtained through calculation.

In some embodiments, the controller 13 may input the current first pressure data, the current second pressure data, and the current temperature data into a determined preset algorithm to obtain the predicted current third pressure data by calculation.

The preset condition refers to a condition that needs to be met for a difference between the predicted current pressure data and a measured current third pressure data. For example, the preset condition may be that the difference between the predicted current pressure data and the measured current third pressure data is greater than a preset threshold.

The preset threshold may be preset by those skilled in the art based on experience.

In some embodiments, the controller 13 may determine the difference between the predicted current pressure data and the measured current third pressure data based on a vector distance (e.g., Euclidean distance, etc.) between the predicted current pressure data and the measured current third pressure data. For example, the greater the vector distance, the greater the difference.

In some embodiments, the controller 13 may compare the difference between the predicted current pressure data and the measured current third pressure data with the preset threshold. When the difference is greater than the preset threshold, it indicates a presence of leaked gas in the explosion chambers, and a warning notification is issued.

The warning notification refers to a warning issued for a possibility of a gas leakage event. The warning notification may include one or more of a voice warning, a text warning, a video warning, etc.

In some embodiments of the present disclosure, the predicted current third pressure data inside the explosion chambers is determined through the preset algorithm, and then the difference between the predicted current third pressure data and the current third pressure data detected by the third pressure sensors is compared with the preset threshold to issue the warning notification in a timely manner if the difference is greater than the preset threshold, thus, achieving timely warning of the presence of gas leakage in the explosion chambers.

Throughout an entire process of an exploration operation of the device for full-wave field seismic source, one or more faults or errors may occur in the device for full-wave field seismic source, thereby causing the final generated seismic waves do not satisfy requirements. For example, a misplacement of the high-strength steel plates 9 may cause a deviation in a direction of the generated seismic waves (mainly in the direction of shear waves), thereby causing the final generated seismic waves do not satisfy the requirements. As another example, damage to the device for full-wave field seismic source caused by an explosion and a failure to open the inner barrel long strip lids 71 may also cause the final generated seismic waves do not satisfy the requirements, etc.

In some embodiments, throughout the entire process of the exploration operation of the device for full-wave field seismic source, the controller 13 is further configured to determine fault distribution information of the device for full-wave field seismic source based on the third pressure data obtained from the third pressure sensors, seismic wave acquisition data within a seismic exploration work area of the full-wave field, gas usage within the explosion chambers, the temperature data, and a device configuration parameter by using a fault determination model. Furthermore, the controller 13 is configured to determine whether there is a fault in the device for full-wave field seismic source and a type of the fault based on the fault distribution information and a preset fault threshold.

The seismic wave acquisition data refers to acquired seismic wave fluctuation signal data within a preset time period. In some embodiments, the controller may obtain the seismic wave acquisition data through a three-component geophone.

The gas usage refers to volumes of air and gas injected into the explosion chambers.

In some embodiments, the controller 13 may determine the gas usage based on the pressure data.

For example, the controller 13 may determine the gas usage based on the pressure data through a first preset lookup table. The first preset lookup table includes a correspondence between reference pressure data and reference gas usage. The first preset lookup table may be constructed based on prior knowledge or historical data.

The device configuration parameter refer to a configuration parameter of the device for full-wave field seismic source, such as a specification (e.g., a height of the high-strength steel plate 9) of the high-strength steel plates 9. In some embodiments, the controller 13 may obtain the device configuration parameter through a parameter recommendation model. More details about the parameter recommendation model may refer to the related description of the seismic data acquisition method.

The fault distribution information refers to information related to one or more fault distributions on the device for full-wave field seismic source.

In some embodiments, the fault distribution information includes possible fault types and corresponding confidences on the device for full-wave field seismic source. For example, the fault distribution information=((Fault Type 1, Confidence 1), (Fault Type 2, Confidence 2), . . . ).

The fault types refer to classification information of faults on the device for full-wave field seismic source. The fault types may include one or more of a first explosion-proof metal gas tank fault, a second explosion-proof metal gas tank fault, an explosion chamber fault, a high-strength steel plate fault, etc.

In some embodiments, the fault determination model is a machine learning model. In some embodiments, the fault determination models may include neural networks (NN) model, deep neural networks (DNN) model, etc.

In some embodiments, the fault determination model may be trained based on a large number of first training samples. Each group of the first training samples may include historical sample third pressure data, historical sample seismic wave acquisition data, historical sample gas usage, historical sample temperature data, and a historical sample device configuration parameter. First training labels may be fault types corresponding to the first training samples.

In some embodiments, the controller 13 may conduct a simulated fault experiment to collect third pressure data, seismic wave acquisition data, gas usage, temperature data, and device configuration parameters during the simulated fault experiment as the first training samples, and determine corresponding faults as labels. The simulated fault experiment may be conducted by setting positions of the high-strength steel plates 9 to be offset from a preset position, or the like. The preset position may be set by those skilled in the art based on experience.

In some embodiments, different fault types correspond to different preset fault thresholds. The different preset fault thresholds corresponding to the different fault types may be set by those skilled in the art based on experience.

In some embodiments, the controller 13 may compare the confidences of the different fault types in the fault distribution information with the corresponding preset fault thresholds. If a fault type whose confidence of the fault type exceeds the corresponding preset fault threshold occurs, the controller 13 determines that the device for full-wave field seismic source has a fault, and the fault type mentioned above is determined as the fault type of the device for full-wave field seismic source.

In some embodiments, the controller 13 may also report the fault type of the device for full-wave field seismic source.

In some embodiments of the present disclosure, by using the fault determination model, the prediction of the fault distribution information of the device for full-wave field seismic source is achieved. Based on the aforementioned fault distribution information and the preset fault thresholds, whether the device for full-wave field seismic source has a fault and the fault type is determined, which enables timely detection and resolution of the fault and the fault type, thereby avoiding the generation of seismic waves that do not meet requirements in subsequent operations, which wastes time and resources.

In some embodiments, a first flow control valve may be deployed at a gas outlet of the first explosion-proof metal gas tank 10, and a second flow control valve may be deployed at a gas outlet of the second explosion-proof metal gas tank 11.

The flow control valve refers to a control valve that regulates a flow rate of gas (e.g., air, gas, etc.) injected into the explosion chambers of the explosion-proof metal gas tank, such as a digital mass flow meter, etc. The flow control valve may include at least one of a first flow control valve or a second flow control valve. The explosion-proof metal gas tank may include at least one of the first explosion-proof metal gas tank or the second explosion-proof metal gas tank.

In some embodiments, the controller 13 may also be configured to control the flow rates of air and gas injected into the explosion chambers by controlling the first flow control valve and the second flow control valve.

In some embodiments, the controller 13 may be configured to determine the flow rates of air and gas injected into the explosion chambers based on the gas usage. For example, when the gas usage reaches a preset gas injection volume, the flow rates of air and gas injected into the explosion chambers may be set to zero. The preset gas injection volume may be set by those skilled in the art based on experience.

In some embodiments, since temperature and humidity in an environment where the device for full-wave field seismic source is located may affect the flow rates of air and gas injected into the explosion chambers, the controller 13 is further configured to determine the flow rates of air and gas injected into the explosion chambers based on weather data.

The weather data refers to data related to an external environment in which the device for full-wave field seismic source is located, such as temperature, humidity, etc.

In some embodiments, the controller 13 may determine the flow rates of air and gas injected into the explosion chambers based on the weather data by using a second preset lookup table. The second preset lookup table includes a correspondence between reference weather data and reference flow rates of air and gas injected into the explosion chambers. The second preset lookup table may be constructed based on prior knowledge or historical data. For example, a higher temperature and a lower humidity lead to lower flow rates of air and gas injected into the explosion chambers.

In some embodiments of the present disclosure, when determining the flow rates of air and gas injected into the explosion chambers, the controller 13 also takes into account of the temperature and humidity in the environment where the device for full-wave field seismic source is located. When the external temperature is high and the humidity is low, the flow rates of air and gas injected into the explosion chambers are reduced to avoid excessive heating of the explosion chamber pipelines due to excessive flow rates, which may lead to the risk of accidental ignition.

In some embodiments of the present disclosure, by providing the first flow control valve and the second flow control valve to respectively control the flow rates of air and gas in the first explosion-proof metal gas tank and the second explosion-proof metal gas tank, the air and gas injected into the explosion chambers are prevented from flowing too slowly, which may cause insufficient gas mixing or increase the time required for mixing. Additionally, excessive heating of the explosion chamber pipelines due to overly fast flow rates of air and gas is also avoided, which may pose a risk of accidental ignition.

The method for acquiring seismic data using the device for full-wave field earthquake hypocenter based on a gas explosion technology includes the following steps:

S1, arranging three-component geophones in a full-wave field seismic exploration work area in accordance with geophone positions laid out on a construction design scheme, so that for each of the three-component geophones, directions of two horizontal components of the three-component geophone are parallel and perpendicular to a survey line of the three-component geophone.

S2, excavating a pit body based on artificial seismic source locations laid out on the construction design plan, burying the device for full-wave field seismic source into the pit body, so that a pair of the high-strength steel plates on two sides of the explosion-proof metal outer barrel 1 are oriented in a same direction of a seismic source line, releasing a connection between a pair of the high-strength steel plates 9 parallel to the direction of the seismic source line and the explosion-proof metal outer barrel 1, so that the pair of the high-strength steel plates 9 parallel to the direction of the seismic source line do not rotate with the explosion-proof metal outer barrel 1, and backfilling the pit body and compacting backfilled soil or sediment;

S3, rotating a connecting line of two inner barrel vertical grooves 7 of the explosion-proof metal gas explosion inner barrel 4 to a direction parallel to the seismic source line, locking the explosion-proof metal gas explosion inner barrel 4, so that the explosion-proof metal gas explosion inner barrel 4 is unable to be rotated in any direction, and locking two high-strength steel plates 9 perpendicular to the seismic source line, so that the two high-strength steel plates 9 perpendicular to the seismic source line are rotated with the explosion-proof metal outer barrel 1;

S4, locking two inner barrel long strip lids 71 on two side surfaces of the explosion-proof metal gas explosion inner barrel 4 through the controller 13, locking the four outer barrel long strip lids 21 on a side surface of the explosion-proof metal outer barrel 1, and opening two inner barrel circular lids 81 of the explosion-proof metal gas explosion inner barrel 4 and the outer barrel circular lid 31 of the explosion-proof metal outer barrel 1 through the controller 13;

S5, opening simultaneously gas supply valves of the first explosion-proof metal gas tank 10 and the second explosion-proof metal gas tank 11 to inject exactly a same volume of the high-pressure air and the high-pressure gas into the two gas explosion chambers inside the explosion-proof metal gas explosion inner barrel 4 through the controller 13;

S6, detonating simultaneously high-pressure mixed gas inside the explosion-proof metal gas explosion inner barrel 4 in accordance with a pre-designed time through the electronic ignition gun 6 by using the GPS timing module 12 of the controller 13;

S7, pushing away the inner barrel circular lids 81 and the outer barrel circular lid 31 with a high speed when a pressure of high-pressure explosion gas generated by an explosion of the high-pressure mixed gas inside the explosion-proof metal gas explosion inner barrel 4 reaches a certain threshold value, so that the inner barrel circular lids 81 and the outer barrel circular lid 31 impact stratum at a bottom of the explosion-proof metal outer barrel 1 to generate longitudinal waves propagating downwardly;

S8, locking the inner barrel circular lids 81 and the outer barrel circular lid 31, and opening the inner barrel long strip lids 71 and the outer barrel long strip lids 21 through the controller 13;

S9, opening simultaneously the gas supply valves of the first explosion-proof metal gas tank 10 and the second explosion-proof metal gas tank 11 to inject exactly the same volume of the high-pressure air and the high-pressure gas into the two gas explosion chambers inside the explosion-proof metal gas explosion inner barrel 4;

S10, detonating simultaneously the high-pressure mixed gas inside the explosion-proof metal gas explosion inner barrel 4 in accordance with the pre-designed time through the electronic ignition gun 6 by using the GPS timing module 12 of the controller 13;

S11, pushing away the inner barrel long strip lids 71 and the outer barrel long strip lids 21 with a high speed when the pressure of the high-pressure explosion gas generated by the explosion of the high-pressure mixed gas inside the explosion-proof metal gas explosion inner barrel 4 reaches the certain threshold value, so that the high-pressure explosion gas impacts two corresponding wall surfaces of the explosion-proof metal outer barrel 1 with a high speed along two opposite tangent directions of the explosion-proof metal gas explosion inner barrel 4, thereby causing the explosion-proof metal outer barrel 1 to rotate around a central axis, and the high-strength steel plates fixed on the explosion-proof metal outer barrel 1 are driven to be rotated with the explosion-proof metal outer barrel 1;

S12, generating shear transverse waves parallel to the survey line of the seismic source that are centered on the explosion-proof metal outer barrel 1 through an underground medium based on the rotation of the high-strength steel plates 9;

S13, opening the explosion-proof metal gas explosion inner barrel 4 fixedly locked in step S2, rotating the explosion-proof metal gas explosion inner barrel 4 with 90 degrees in a clockwise or counterclockwise direction, rotating the connecting line of the two inner barrel vertical grooves 7 of the explosion-proof metal gas explosion inner barrel 4 in a direction perpendicular to the seismic source line, fixing and locking the explosion-proof metal gas explosion inner barrel 4, so that the explosion-proof metal gas explosion inner barrel 4 is unable to be further rotated in any direction, locking the two high strength steel plates 9 parallel to the direction of the seismic source line, so that the two high strength steel plates parallel to the direction of the seismic source line are able to rotate with the explosion-proof metal outer barrel 1, and releasing the connection between the pair of the high strength steel plates perpendicular to the direction of the seismic source line and the explosion-proof metal outer barrel 1, so that the pair of the high strength steel plates 9 perpendicular to the direction of the seismic source line are unable to be rotated with the explosion-proof metal outer barrel 1;

S14, opening the inner barrel long strip lids 71 and the outer barrel long strip lids 21 through the controller 13;

S15, opening simultaneously the gas supply valves of the first explosion-proof metal gas tank 10 and the second explosion-proof metal gas tank 11 to inject exactly the same volume of the high-pressure air and the high-pressure gas into the two gas explosion chambers inside the explosion-proof metal gas explosion inner barrel 4;

S16, detonating simultaneously the high-pressure mixed gas inside the explosion-proof metal gas explosion inner barrel 4 in accordance with the pre-designed time through the electronic ignition gun 6 by using the GPS timing module 12 of the controller 13;

S17, pushing away two of the inner barrel long strip lids 71 and the outer barrel long strip lids 21 with a high speed when the pressure of the high-pressure explosion gas generated by the explosion of the high-pressure mixed gas inside the explosion-proof metal gas explosion inner barrel 4 reaches the certain threshold value, so that the high-pressure explosion gas impacts the two corresponding wall surfaces of the explosion-proof metal outer barrel 1 with a high speed along the two opposite tangent directions of the explosion-proof metal gas explosion inner barrel 1, thereby causing the explosion-proof metal outer barrel 1 to rotate around the central axis, and the high-strength steel plates 9 fixed on the explosion-proof metal outer barrel are driven to be rotated with the explosion-proof metal outer barrel 1;

S18, generating the shear transverse waves perpendicular to a direction of the survey line of the seismic source that are centered on the explosion-proof metal outer barrel 1 through the underground medium based on the rotation of the high-strength steel plates 9;

S19, acquiring longitudinal wave data and two transverse wave data orthogonal to each other and parallel to ground excited in sequence through a seismic source point on the ground in three times in accordance with the three-component geophones deployed on the construction design scheme;

S20, acquiring the longitudinal wave data and the two transverse wave data orthogonal to each other and parallel to the ground excited in sequence through the seismic source point on the ground in three times in accordance with a location of each seismic source point within the full-wave field seismic exploration work area in accordance with steps S2 to S19;

S21, combining and merging the longitudinal wave data, the transverse wave data parallel to the survey line of the seismic source, and the transverse wave data perpendicular to the survey line of the seismic source acquired in sequence from all seismic source points, respectively, to form full-wave field-three-dimensional seismic data volumes of three components in three directions respectively;

S22, processing three-dimensional seismic longitudinal waveform data volume of a vertical component, transverse waveform data volume of a horizontal component parallel to the direction of the survey line of the seismic source, and horizontal component transverse waveform data volume of a horizontal component perpendicular to the direction of the survey line of the seismic source, respectively, obtaining reflection longitudinal waveform imaging data volume of the vertical component, reflection transverse waveform imaging data volume of the horizontal component parallel to the direction of the survey line of the seismic source, and reflection transverse waveform imaging data volume of the horizontal component perpendicular to the direction of the survey line of the seismic source in sequence, and carrying out interpretation of a fine structure of an underground geologic body by integrating three sets of reflection wave imaging data volumes; and S23, extracting relevant attributes by performing an inversion processing on the three sets of reflection wave imaging data volumes, respectively, and carrying out comprehensive prediction, evaluation, and quantitative interpretation of fluid distribution within the underground geologic body and oil and gas reservoir.

The present disclosure provides the device for full-wave field seismic source and the method for acquiring seismic data based on the gas explosion technology, which can sequentially excite vertical longitudinal wave source signals propagating vertically downward from the ground at each seismic source point, shear wave source signals propagating parallel to the seismic source line direction and downward from the ground, and shear wave source signals propagating vertically to the seismic source line direction and downward from the ground. The three-component geophones deployed on the ground can sequentially record the longitudinal wave data and the two transverse wave data (i.e., horizontal wave data parallel to the seismic source line and horizontal wave data perpendicular to the seismic source line) orthogonal to each other and parallel to the ground, thereby truly achieving full-wave field seismic exploration.

In some embodiments, the controller 13 may also determine a recommended deployment parameter based on an exploration plan and geographical information of the seismic exploration work area of the full-wave field.

The exploration plan refers to a plan pre-established for seismic exploration, such as an exploration range, exploration accuracy, etc. In some embodiments, the exploration plan may be set by those skilled in the art based on experience.

The geographic information refers to information related to spatial geographic distribution of the exploration range. For example, the geographic information includes one or more of a geographic location of the exploration range (e.g., latitude and longitude information), topographic data, an estimated stratigraphic structure, etc. The estimated stratigraphic structure refers to a predicted stratigraphic structure of land within the exploration range.

In some embodiments, the controller 13 may obtain the geographic information from a third party. For example, the controller 13 may obtain geographic location data, topographic data, etc., from an online map (e.g., Google Maps, Gaode Maps, etc.) for exploration sites. As another example, the controller 13 may query and obtain estimated geological structure information for the exploration range based on the geographic location of the exploration range from geological information websites (e.g., China official geological websites).

Used gas type refers to a type of used gas when executing the exploration plan. For example, the used gas type include air, fuel gas, or the like. In some embodiments, the used gas type may be determined by those skilled in the art based on experience.

The recommended deployment parameter refers to a deployment parameter of the device for full-wave field seismic source recommended for use when executing the exploration plan.

In some embodiments, the recommended deployment parameter may include at least one of a recommended gas volume to be used in the gas explosion chambers or the device configuration parameter.

The recommended gas volume to be used refers to a recommended amount of gas to be used with the device for full-wave field seismic source when executing the exploration plan. For example, the recommended gas volume to be used may be 30 cubic meters.

More details about the device configuration parameter may refer to the related description of the device for full-wave field seismic source.

In some embodiments, the controller 13 may determine the recommended deployment parameter based on the exploration plan, the geographical information data, and the used gas type by using a third preset lookup table. The third preset lookup table includes a correspondence between a reference exploration plan, reference geographical information data, a reference used gas type, and a reference recommended deployment parameter. The third preset lookup table may be constructed based on prior knowledge or historical data.

In some embodiments, the controller 13 may also determine the recommended deployment parameter based on the exploration plan, the geographical information data, and the used gas type by using a parameter recommendation model.

In some embodiments, the parameter recommendation model may be a machine learning model. For example, the parameter recommendation model may include convolutional neural networks (CNN) model, neural networks (NN) model, other customized model structures, or the like, or any combination thereof.

In some embodiments, the parameter recommendation model may be trained based on a large number of second training samples.

Each group of the second training samples may include a historical sample exploration plan, historical sample geographical information, and a historical sample used gas type. Second training labels may be historical sample recommended deployment parameters corresponding to the second training samples.

In some embodiments, the second training samples may be obtained from historical data. The second training labels may be determined by conducting exploration with a plurality of sets of historical sample candidate deployment parameters under a condition of the same second training samples, and historical sample candidate deployment parameters that provides the best exploration results may be determined as the historical sample recommended deployment parameters. The best exploration results refer to achieving exploration requirements with a lowest cost. The exploration requirements refer to meeting a need for subsequent seismic source analysis. The lowest cost may include a minimum volume of gas usage, a minimum height of the high-strength steel plates, etc.

In some embodiments of the present disclosure, the recommended deployment parameter determined based on the exploration plan, the geographical information, and the used gas type in the seismic exploration work area can meet the exploration requirements of the seismic exploration work area while minimizing costs.

Some embodiments of the present disclosure further provides a method for acquiring seismic data based on the device for full-wave field seismic source based on the gas explosion technology. The method is executed by the controller 13 and includes the following steps:

S1, arranging three-component geophones in a full-wave field seismic exploration work area in accordance with geophone positions laid out on a construction design scheme, so that for each of the three-component geophones, directions of two horizontal components of the three-component geophone are parallel and perpendicular to a survey line of the three-component geophone;

S2, excavating a pit body based on artificial seismic source locations laid out on the construction design plan, burying the device for full-wave field seismic source into the pit body, so that a pair of the high-strength steel plates on two sides of the explosion-proof metal outer barrel 1 are oriented in a same direction of a seismic source line, releasing a connection between a pair of the high-strength steel plates 9 parallel to the direction of the seismic source line and the explosion-proof metal outer barrel 1, so that the pair of the high-strength steel plates 9 parallel to the direction of the seismic source line do not rotate with the explosion-proof metal outer barrel 1, and backfilling the pit body and compacting backfilled soil or sediment;

S3, rotating a connecting line of two inner barrel vertical grooves 7 of the explosion-proof metal gas explosion inner barrel 4 to a direction parallel to the seismic source line, locking the explosion-proof metal gas explosion inner barrel 4, so that the explosion-proof metal gas explosion inner barrel 4 is unable to be rotated in any direction, and simultaneously, locking two high-strength steel plates 9 perpendicular to the seismic source line, so that the two high-strength steel plates 9 perpendicular to the seismic source line are rotated with the explosion-proof metal outer barrel 1;

S4, locking two inner barrel long strip lids 71 on two side surfaces of the explosion-proof metal gas explosion inner barrel 4, simultaneously, locking the four outer barrel long strip lids 21 on a side surface of the explosion-proof metal outer barrel 1, and opening two inner barrel circular lids 81 of the explosion-proof metal gas explosion inner barrel 4 and the outer barrel circular lid 31 of the explosion-proof metal outer barrel 1;

S5, opening simultaneously gas supply valves of the first explosion-proof metal gas tank 10 and the second explosion-proof metal gas tank 11 to inject exactly a same volume of the high-pressure air and the high-pressure gas into the two gas explosion chambers inside the explosion-proof metal gas explosion inner barrel 4;

S6, detonating simultaneously high-pressure mixed gas inside the explosion-proof metal gas explosion inner barrel 4 in accordance with a pre-designed time through the electronic ignition gun 6 by using the GPS timing module 12;

S7, pushing away the inner barrel circular lids 81 and the outer barrel circular lid 31 with a high speed in response to a pressure of high-pressure explosion gas generated by an explosion of the high-pressure mixed gas inside the explosion-proof metal gas explosion inner barrel 4 reaching a certain threshold value, so that the inner barrel circular lids 81 and the outer barrel circular lid 31 impact stratum at a bottom of the explosion-proof metal outer barrel 1 to generate longitudinal waves propagating downwardly;

S8, locking the inner barrel circular lids 81 and the outer barrel circular lid 31, and opening the inner barrel long strip lids 71 and the outer barrel long strip lids 21;

S9, opening simultaneously the gas supply valves of the first explosion-proof metal gas tank 10 and the second explosion-proof metal gas tank 11 to inject exactly the same volume of the high-pressure air and the high-pressure gas into the two gas explosion chambers inside the explosion-proof metal gas explosion inner barrel 4;

S10, detonating simultaneously the high-pressure mixed gas inside the explosion-proof metal gas explosion inner barrel 4 in accordance with the pre-designed time through the electronic ignition gun 6 by using the GPS timing module 12;

S11, pushing away the inner barrel long strip lids 71 and the outer barrel long strip lids 21 with a high speed in response to the pressure of the high-pressure explosion gas generated by the explosion of the high-pressure mixed gas inside the explosion-proof metal gas explosion inner barrel 4 reaching the certain threshold value, so that the high-pressure explosion gas impacts two corresponding wall surfaces of the explosion-proof metal outer barrel 1 with a high speed along two opposite tangent directions of the explosion-proof metal gas explosion inner barrel 4, thereby causing the explosion-proof metal outer barrel 1 to rotate around a central axis, and the high-strength steel plates fixed on the explosion-proof metal outer barrel 1 are driven to be rotated with the explosion-proof metal outer barrel 1;

S12, generating shear transverse waves parallel to the survey line of the seismic source that are centered on the explosion-proof metal outer barrel 1 through an underground medium based on the rotation of the high-strength steel plates 9;

S13, opening the explosion-proof metal gas explosion inner barrel 4 fixedly locked in step S2, rotating the explosion-proof metal gas explosion inner barrel 4 with 90 degrees in a clockwise or counterclockwise direction, rotating the connecting line of the two inner barrel vertical grooves 7 of the explosion-proof metal gas explosion inner barrel 4 in a direction perpendicular to the seismic source line, fixing and locking the explosion-proof metal gas explosion inner barrel 4, so that the explosion-proof metal gas explosion inner barrel 4 is unable to be further rotated in any direction, simultaneously, locking the two high strength steel plates 9 parallel to the direction of the seismic source line, so that the two high strength steel plates parallel to the direction of the seismic source line are able to rotate with the explosion-proof metal outer barrel 1, and releasing the connection between the pair of the high strength steel plates perpendicular to the direction of the seismic source line and the explosion-proof metal outer barrel 1, so that the pair of the high strength steel plates 9 perpendicular to the direction of the seismic source line are unable to be rotated with the explosion-proof metal outer barrel 1;

S14, opening the inner barrel long strip lids 71 and the outer barrel long strip lids 21;

S15, opening simultaneously the gas supply valves of the first explosion-proof metal gas tank 10 and the second explosion-proof metal gas tank 11 to inject exactly the same volume of the high-pressure air and the high-pressure gas into the two gas explosion chambers inside the explosion-proof metal gas explosion inner barrel 4;

S16, detonating simultaneously the high-pressure mixed gas inside the explosion-proof metal gas explosion inner barrel 4 in accordance with the pre-designed time through the electronic ignition gun 6 by using the GPS timing module 12;

S17, pushing away two of the inner barrel long strip lids 71 and the outer barrel long strip lids 21 with a high speed in response to the pressure of the high-pressure explosion gas generated by the explosion of the high-pressure mixed gas inside the explosion-proof metal gas explosion inner barrel 4 reaching the certain threshold value, so that the high-pressure explosion gas impacts the two corresponding wall surfaces of the explosion-proof metal outer barrel 1 with a high speed along the two opposite tangent directions of the explosion-proof metal gas explosion inner barrel 1, thereby causing the explosion-proof metal outer barrel 1 to rotate around the central axis, and the high-strength steel plates 9 fixed on the explosion-proof metal outer barrel are driven to be rotated with the explosion-proof metal outer barrel 1;

S18, generating the shear transverse waves perpendicular to a direction of the survey line of the seismic source that are centered on the explosion-proof metal outer barrel 1 through the underground medium based on the rotation of the high-strength steel plates 9;

S19, acquiring longitudinal wave data and two transverse wave data orthogonal to each other and parallel to ground excited in sequence through a seismic source point on the ground in three times in accordance with the three-component geophones deployed on the construction design scheme;

S20, acquiring the longitudinal wave data and the two transverse wave data orthogonal to each other and parallel to the ground excited in sequence through the seismic source point on the ground in three times in accordance with a location of each seismic source point within the full-wave field seismic exploration work area in accordance with steps S2 to S19;

S21, combining and merging the longitudinal wave data, the transverse wave data parallel to the survey line of the seismic source, and the transverse wave data perpendicular to the survey line of the seismic source acquired in sequence from all seismic source points, respectively, to form full-wave field-three-dimensional seismic data volumes of three components in three directions respectively;

S22, processing three-dimensional seismic longitudinal waveform data volume of a vertical component, transverse waveform data volume of a horizontal component parallel to the direction of the survey line of the seismic source, and horizontal component transverse waveform data volume of a horizontal component perpendicular to the direction of the survey line of the seismic source, respectively, obtaining reflection longitudinal waveform imaging data volume of the vertical component, reflection transverse waveform imaging data volume of the horizontal component parallel to the direction of the survey line of the seismic source, and reflection transverse waveform imaging data volume of the horizontal component perpendicular to the direction of the survey line of the seismic source in sequence, and carrying out interpretation of a fine structure of an underground geologic body by integrating three sets of reflection wave imaging data volumes; and S23, extracting relevant attributes by performing an inversion processing on the three sets of reflection wave imaging data volumes, respectively, and carrying out comprehensive prediction, evaluation, and quantitative interpretation of fluid distribution within the underground geologic body and oil and gas reservoir.

The basic concepts have been described above, and it will be apparent to those skilled in the art that the foregoing detailed disclosure is intended as an example only and does not constitute a limitation of the present disclosure. Although not expressly stated herein, a person skilled in the art may make various modifications, improvements, and amendments to the present disclosure. Such modifications, improvements, and amendments are suggested in the present disclosure, so such modifications, improvements, and amendments remain within the spirit and scope of the exemplary embodiments of the present disclosure.

What is claimed is:

1. A device for a seismic source, comprising:
   an explosion-proof metal outer barrel and an explosion-proof metal gas explosion inner barrel, the explosion-proof metal outer barrel and the explosion-proof metal gas explosion inner barrel being provided as a coaxial line arrangement, and the explosion-proof metal gas explosion inner barrel being configured to rotate relative to the explosion-proof metal outer barrel, wherein
   an outer wall of the explosion-proof metal outer barrel is provided with outer barrel vertical grooves, a bottom center of the explosion-proof metal outer barrel is provided with an outer barrel hole, the outer barrel vertical grooves are provided with first outer barrel lids, and the outer barrel hole is provided with a second outer barrel lid;
   the outer wall of the explosion-proof metal outer barrel is further connected with high-strength steel plates; and
   the explosion-proof metal gas explosion inner barrel is divided into two gas explosion chambers according to a preset pattern, the two gas explosion chambers are connected to pipelines configured to inject high-pressure air and high-pressure gas, tail tips of the two gas explosion chambers are provided with inner barrel vertical grooves, bottom centers of the two gas explosion chambers are provided with inner barrel holes, the inner barrel holes are provided with first inner barrel lids, and the inner barrel vertical grooves are provided with second inner barrel lids;
   a first explosion-proof metal gas tank and a second explosion-proof metal gas tank, wherein
   the first explosion-proof metal gas tank is configured to store compressed air and the second explosion-proof metal gas tank is configured to store compressed gas;
   an electronic ignition gun is installed in the explosion-proof metal gas explosion inner barrel, and the electronic ignition gun is connected to a GPS timing module;
   a controller configured to control the electronic ignition gun and an opening and closing of the first outer barrel lids, the second outer barrel lids, the first inner barrel lids, and the second inner barrel lids; and
   a pressure sensing unit configured to monitor pressure data, the pressure sensing unit including a first pressure sensor deployed inside the first explosion-proof metal gas tank and a second pressure sensor deployed inside the second explosion-proof metal gas tank.

2. The device of claim 1, wherein a count of the outer barrel vertical grooves is four, and the four outer barrel vertical grooves are provided in a symmetric arrangement on the outer wall of the explosion-proof metal outer barrel.

3. The device of claim 2, wherein a count of the high-strength steel plates is four, the four high-strength steel plates are provided in a symmetric arrangement, a length of each of the four high-strength steel plates is within a range of 1 meter to 5 meters, and a width of the each of the four high-strength steel plates is equal to a height of the explosion-proof metal outer barrel.

4. The device of claim 1, wherein the pressure sensing unit further includes a third pressure sensor, and the third pressure sensor is deployed inside at least one of the two gas explosion chambers.

5. The device of claim 4, wherein the controller is further configured to:
   determine predicted current third pressure data based on first pressure data obtained by the first pressure sensor, second pressure data obtained by the second pressure sensor, third pressure data obtained by the third pressure sensor, and the temperature data obtained by temperature sensors by using a preset algorithm;

determine whether gas leakage occurs within the gas explosion chamber based on a difference between the predicted current third pressure data and current third pressure data obtained by the third pressure sensor; and in response to determining that the gas leakage occurs within the gas explosion chamber, issue a warning notification.

6. The device of claim 5, wherein the controller is further configured to:

determine fault distribution information of the device for a seismic source based on the third pressure data, seismic wave acquisition data within a seismic exploration work area, gas usage within the two gas explosion chambers, the temperature data, and a device configuration parameter by using a fault determination model, the fault determination model being a machine learning model, and the fault distribution information including possible fault types and corresponding confidences; and determine whether there is a fault in the device for a seismic source and a type of the fault based on the fault distribution information and a preset fault threshold.

7. The device of claim 1, wherein a first flow control valve is deployed at a gas outlet of the first explosion-proof metal gas tank, a second flow control valve is deployed at a gas outlet of the second explosion-proof metal gas tank, and the controller is further configured to control flow rates of air and gas injected into the two gas explosion chambers by controlling the first flow control valve and the second flow control valve.

8. The device of claim 7, wherein the controller is further configured to determine the flow rates of air and gas injected into the two gas explosion chambers based on weather data.

* * * * *